United States Patent [19]

Hannigan et al.

[11] Patent Number: 4,830,188
[45] Date of Patent: May 16, 1989

[54] PLASTICS SEPARATION AND RECYCLING METHODS

[75] Inventors: Benjamin R. Hannigan, Lakehurst; Jose R. Fernandes, Avenel, both of N.J.

[73] Assignee: Rutgers, The State University, Piscataway, N.J.

[21] Appl. No.: 102,122

[22] Filed: Sep. 30, 1987

[51] Int. Cl.[4] ........................... B03B 5/28; B03B 5/44
[52] U.S. Cl. .......................................... 209/3; 209/17; 209/173; 209/172.5; 241/24; 241/DIG. 38
[58] Field of Search ..................... 209/173, 172.5, 172, 209/3, 17, 12, 13; 241/20, 24, DIG. 38, 79.1

[56] References Cited

U.S. PATENT DOCUMENTS

| 722,500 | 3/1903 | Dounard | 209/173 |
|---|---|---|---|
| 915,832 | 3/1909 | Dekker | 209/173 |
| 987,943 | 3/1911 | Beck | 209/17 |
| 1,410,340 | 3/1922 | Merwin | 209/17 |
| 2,410,633 | 11/1946 | Counselman | 209/17 |
| 3,387,793 | 6/1968 | Burner | 241/20 |
| 4,194,926 | 3/1980 | Barnsbee | 209/173 |
| 4,208,015 | 6/1980 | Fujita | 241/20 |
| 4,617,111 | 10/1986 | Grimm | 209/173 |
| 4,728,045 | 3/1988 | Tomaszek | 241/19 |

FOREIGN PATENT DOCUMENTS

| 228724 | 7/1987 | European Pat. Off. | 209/173 |
|---|---|---|---|
| 3002061 | 7/1981 | Fed. Rep. of Germany | 209/173 |
| 3210972 | 10/1983 | Fed. Rep. of Germany | 209/173 |
| 3339079 | 5/1985 | Fed. Rep. of Germany | 209/173 |
| 218860 | 2/1985 | German Democratic Rep. | 209/173 |
| 139684 | 10/1979 | Japan | 209/3 |
| 906716 | 2/1982 | U.S.S.R. | 209/173 |
| 1552118 | 9/1979 | United Kingdom | 209/3 |
| 2078138 | 1/1982 | United Kingdom | 209/173 |

Primary Examiner—Kenneth M. Schor
Assistant Examiner—Thomas M. Lithgow
Attorney, Agent, or Firm—Lerner, David, Littenberg, Krumholz & Mentlik

[57] ABSTRACT

Plastics fragments including polyethylene terephthalate and polyolefins derived from comminution of containers such as beverage bottles are segregated according to specific gravity by flotation. The flotation liquid includes a surfactant to facilitate complete separation of the light and heavy plastic fractions from one another. The surfactant may be a residue of a detergent used to wash the flakes and remove contaminants therefrom. Rinsing prior to flotation separation is controlled so as to leave the desired detergent residue leading to a marked reduction in rinse water requirements.

23 Claims, 2 Drawing Sheets

PLASTICS SEPARATION AND RECYCLING METHODS

BACKGROUND OF THE INVENTION

The present invention relates to methods of separating plastics and to plastic container recycling processes.

Plastic beverage bottles including gas transport resistant walls formed from polyethylene terepthalate or "PET" have supplanted other containers for carbonated beverages in recent years, particularly in 1-liter and larger sizes. The widespread use of these containers has created a significant need for methods of recycling the used containers. Many PET-walled beverage containers include base caps or reinforcements formed from relatively low cost polyolefin plastics such as high density polyethylene. Used containers recovered from the municipal waste stream, as by a community recycling effort or the like, may also include polyolefin-walled bottles such as common polyethylene milk containers together with the PET-walled bottles. To provide salable recycled products, the polyolefin and PET components must be separated from one another. Moreover, used containers as received at the recycling plant ordinarily include aluminum caps and contaminants such as paper labels, adhesives holding the labels onto the containers and dirt such as beverage residues. The recycling process should be capable of segregating these contaminants from the PET and polyolefins.

The broad outlines of a recycling process for used bottles of this nature have long been known to those skilled in the plastics recycling art. This known process begins with the comminution of the incoming bottles and air classification of the resulting fragments to remove loose labels, dirt and fine particles. Following classification, the remaining fragments are washed in a hot detergent solution to remove the remaining paper label fragments and adhesives. The detergent solution is then drained from the fragments and any residual detergent solution is thoroughly rinsed from the drained chips with water. After rinsing, the fragments are separated by flotation in water. As PET and aluminum are denser than water, whereas polyolefins are less dense than water, the PET and aluminum fragments sink, and the polyolefin fragments float. After drying, the floating or lighter fragments consist essentially of pure polyolefin. The PET and aluminum in the heavier fragments can be separated from one another after drying by electrostatic or other means. These segregated fragments provide separate streams of substantially pure PET and aluminum.

Although this general process outline has been widely regarded as a promising approach to the problem of plastic bottle recycling, there have been significant unmet needs heretofore for improvements in the individual steps and in the process as a whole. Considerable practical difficulties have been encountered heretofore in the flotation step of the process. It has been difficult to obtain complete separation of the PET and polyolefin fractions in the product stream. Typically, each stream has been contaminated by a considerable portion of the other plastic. This phenomenon is commonly referred to as "cross-contamination". These difficulties become more severe as attempts are made to increase the throughput rate of the process. Plastic containers typically have very thin walls. When these containers are comminuted, the resulting fragments are in the form of thin, platelike flakes having one very small dimension and two parallel oppositely-facing planar or gently curved surfaces. Despite the substantial difference in density between PET and polyolefin flakes, flotation separation results obtained with these flakes heretofore have been unacceptable.

The rinsing operation has also involved considerable practical difficulties. Large amounts of water have been consumed in thoroughly rinsing the detergent from the flakes prior to the separation step. As the rinse water ordinarily is not recycled or is only partially recycled, rinse water consumption affects the amount of fresh water required by the process, and also affects the amount of used water discharged to municipal sewers or to the environment. Reduction in the time and equipment requirements for the rinsing step of the process would improve the economics of the process.

Accordingly, there have been substantial needs heretofore for improvements in the recycling process and in the operations employed therein.

SUMMARY OF THE INVENTION

The present invention addresses those needs.

One aspect of the present invention provides a method of separating mixed plastic flakes of high and low specific gravities into heavy and light fractions. In a method according to this aspect of the present invention, the mixed flakes are placed into a flotation liquid so that each flake sinks or floats according to its density. Those flakes denser than the flotation liquid tend to sink, whereas those flakes less dense than the flotation liquid will tend to float. The flakes which sink are recovered as a "heavy" fraction, whereas the flakes which float are recovered as a "light" fraction. In the method according to this aspect of the present invention, an effective concentration of a surfactant is maintained so as to substantially reduce the surface tension of the flotation liquid. Thus, the surface tension of the flotation liquid is substantially less than the surface tension which would prevail in the flotation liquid absent the surfactant.

This aspect of the present invention includes the discovery that the surface tension of the flotation liquid has a major influence on the results achieved in the flotation process and particularly upon the purity of the heavy and light fractions. Thus, in processes for separating PET flakes from polyolefin flakes using water as the flotation liquid, incorporation of a surfactant in the flotation liquid so as to reduce the surface tension from about 70-79 dynes/cm to less than about 45 dynes/cm, and preferably between about 30 and about 40 dynes/cm, results in more than a 90% reduction in polyolefin or light plastic contamination of the PET or heavy plastic fraction. Although the present invention is not limited by any theory of operation, it is believed that cross contamination of one fraction by another in a flotation process for plastic flakes is caused at least in part by adhesion of flakes to one another, and that the surface tension of the flotation liquid influences this adhesion. Thus, it is believed that reduction in the surface tension of the flotation liquid facilitates separation of the flakes from one another. The mode of operation of the surfactant in a process according to this aspect of the present invention is manifestly different from the action of surfactants previously used in minerals benefaction processes employing foam or froth to lift one fraction. In those processes, both fractions typically are denser than the flotation liquid. Separation depends upon the different tendencies of the mineral fractions to adhere to the foam and to be lifted by the foam to the top of the flotation liquid. By contrast, in processes according to this aspect of the present invention, foaming is both unnecessary and undesirable, and the flakes are separated according to their respective density, and hence according to their respective buoyancies and weights.

A further aspect of the present invention integrates the improved flotation separation method with the steps of washing raw plastic flakes in a wash liquid and separating the wash liquid. In a method according to this aspect of the present invention, the flakes from the wash liquid separation step are employed as the mixed flakes in the separation method. The step of maintaining an effective concentration of surfactant in the flotation liquid of the flotation separation operation includes the step of conducting the wash liquid separation step so that a surfactant is retained on the mixed flakes provided at the end of the wash liquid separation step. Thus, the retained surfactant on the flakes is carried into the flotation liquid along with the flakes and the retained surfactant from the wash liquid separation step constitutes at least a portion of the surfactant in the flotation liquid.

This aspect of the present invention incorporates the realization that the extensive rinsing processes heretofore suggested by the art to rid washed plastic flakes of all traces of surfactants from the washing operation are not only unnecessary but actually counterproductive. According to this aspect of the present invention, residual surfactants from the wash liquid separation steps, previously regarded as an undesirable contaminant are employed to good use in the flotation separation step.

The wash liquid utilized in the washing process typically incorporates a detergent which includes one or more surfactants. Thus, the wash liquid separation step may be conducted so as to leave a minor fraction of the wash liquid on the flakes at the end of the step. Thus, the major portion of the rinsing previously thought necessary may be omitted. Alternately, the flakes may be rinsed with a rinsing liquid which itself includes a surfactant, so that the surfactant on the flakes at the end of the wash liquid separation step includes some of the surfactant initially present in the rinsing liquid. Such a surfactant-bearing rinsing liquid typically is more effective than plain water in displacing wash liquid from the flakes and hence in removing contaminants present in the residual wash liquid. The discovery that surfactant can be included in the mixed flakes fed to the flotation separation step permits the use of a surfactant-bearing rinse liquid without a further rinse in pure water.

In preferred processes according to this aspect of the present invention, the flotation separation step effectively serves as a final rinsing or decontamination step. Thus, the flakes are exposed intimately to the wash liquid during the flotation separation step so that the concentration of surfactants and contaminants in any liquid adhering to the flakes is reduced to the concentration prevailing in the flotation liquid. The light and heavy flake fractions typically are withdrawn from the flotation liquid with a minor residue of the flotation liquid. The major portion of each such residue preferably is removed from the flakes by mechanical separation rather than by evaporation. Therefore, the major portion of any surfactants or extraneous contaminants in the flotation liquid residues are removed with the liquid. Effective concentrations of surfactant can be maintained in the flotation liquid without appreciably contaminating the resulting flake fractions. The surfactant content of the flake fractions can be even further reduced by contacting the withdrawn flake fractions with fresh, surfactant-free liquid prior to the mechanical separation step. The fresh liquid may be separated from the flakes along with the residual flotation liquid in the mechanical separation step, and the separated liquid can be added as make-up liquid to the flotation liquid.

Processes according to these aspects of the present invention are particularly valuable in treatment of raw flakes derived from containers such as PET/polyolefin beverage bottles. The improvements provided by the present invention thus mitigate longstanding problems in recycling of such containers, and in providing an economically feasible recycling method.

Further aspects of the present invention provide enhanced apparatus for performing processes as discussed above and similar processes.

These and other objects, features and advantages of the present invention will be more fully apparent from the detailed description of the preferred embodiments set forth below, taken in conjunction with the accompanying drawings.

DETAILED DESCRIPTION OF THE PREFERRED EMBODIMENTS

Figure 1:
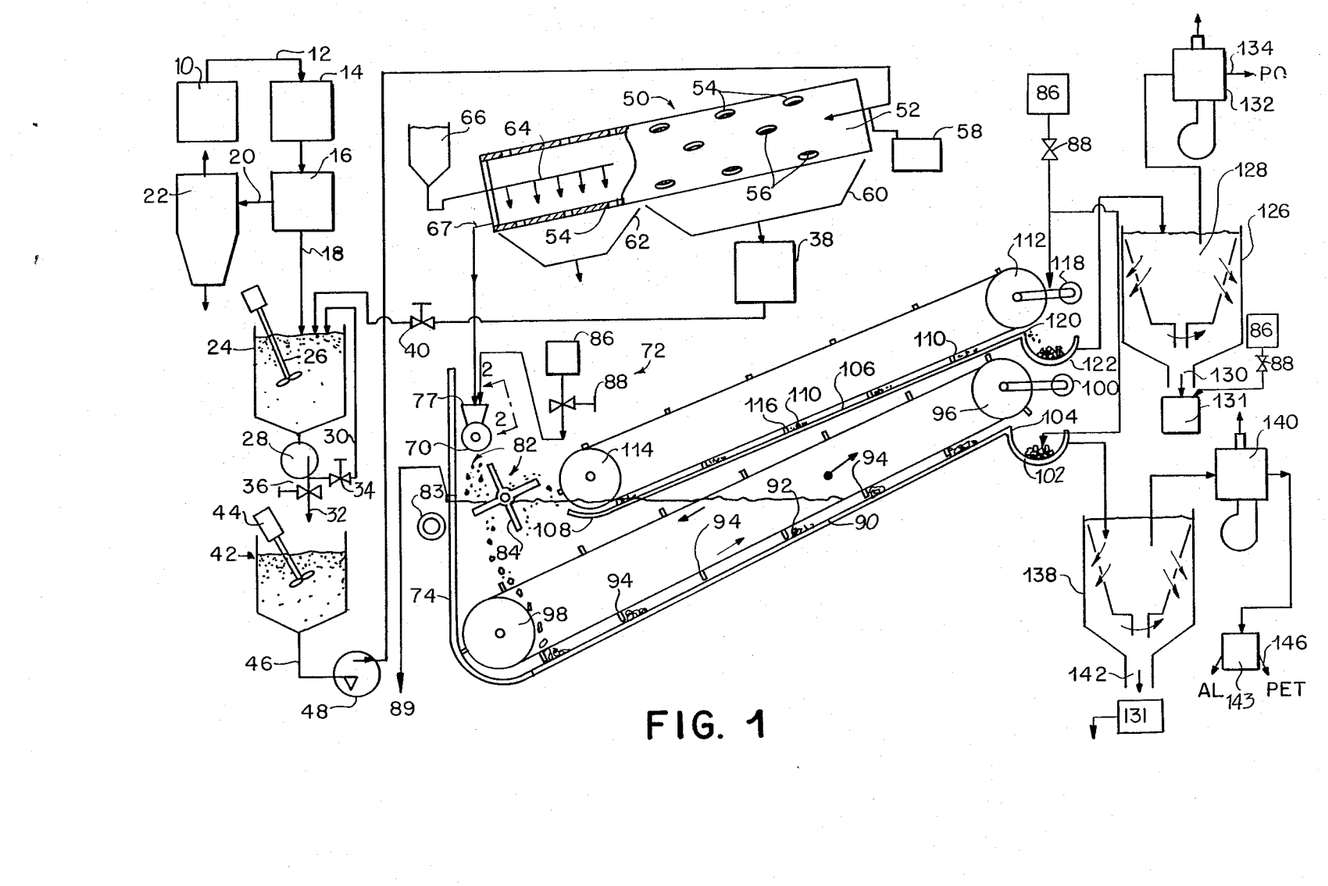
FIG. 1 is a schematic, partially sectional view illustrating methods and apparatus according to one embodiment of the invention.

Apparatus according to one embodiment of the present invention includes a shredder 10 adapted to convert incoming plastic beverage bottles to strips, a conveyor 12 linked to the output of shredder 10 and a granulator 14 connected to the downstream end of conveyor 12. The granulator is arranged to convert the strips from the shredder into smaller particles. Thus, shredder 10 and granulator 14 together constitute apparatus which will comminute incoming bottles. Desirably, these components are selected so that the incoming bottles are reduced to flakes with a maximum dimension of about 6–8 mm. As used in this disclosure, the term "flake" refers to a particle having a pair of generally parallel, oppositely-directly flat or curved major faces and having dimensions along the major faces far larger than the thickness or dimension between the major faces. The term "aspect ratio" as used herein means the ratio of the mean dimension in directions parallel to the major faces to the mean thickness of the flake. As typical beverage containers have wall thicknesses on the order of about 0.25 to 0.50 mm, beverage bottle flakes having major face dimensions of 6–8 mm ordinarily have aspect ratios of at least about 10, and typically between about 10 and 30.

An air classifier 16 is connected to the outlet of granulator 14. The air classifier has a coarse fraction outlet 18 and a fine fraction outlet 20 connected to a conventional cyclone separator. Classifier 16 may be a conventional air classification unit of the type wherein the incoming material is exposed to an upwardly directed flow of air. Relatively coarse particles including the aforementioned flakes will drop to the bottom and hence will pass in to the coarse fraction outlet, whereas particularly fine and/or particularly light materials such as dust, paper and the like are entrained in the upwardly moving air and discharged along with the air through the fines outlet 20. Cyclone separator 22 is arranged to remove these fine materials from the air stream.

The coarse fraction outlet 18 of classifier 16 is connected through appropriate batch-type weighing and materials handling equipment (not shown) to a first stage wash tank 24. Wash tank 24 is provided with a propeller-type agitator 26 and a bottom outlet feeding into a centrifugal pump 28. Pump 28 in turn is connected to a recycle line 30 and a discharge line 32 provided with valves 34 and 36 respectively. Recycle line 30 feeds back into the first stage wash tank 24. First stage wash tank 24 is also connected to a detergent solution tank 38 via a control valve 40.

Discharge line 32 from first stage wash tank 24 is connected to a surge tank or second stage wash tank 42. Tank 42 is also equipped with a propeller type agitator 44, and has a bottom discharge line 46 connected to the inlet of a variable speed centrifugal pump 48. The outlet of pump 48 is connected to the infeed of a reel-type separator 50. Separator 50 includes a large cylindrical drum 52 having perforations 54, of which only some are shown, in its peripheral wall. The perforations 54 are covered with a fine-mesh wire screen 56. Drum 52 is mounted so that its axis is at a slight incline, ordinarily about 2°–3° to the horizontal. Drum 52 is mounted for rotation about its own axis, and a motor 58 is provided to turn the drum.

A drainage pan 60 is mounted below the upper, or upstream end of drum 52, whereas a similar pan 62 is mounted beneath the lower or downstream end. A rinse solution spray pipe 64 extends generally along the axis of drum 52. Spray pipe 64 has a plurality of outlets spaced axially along the lower or downstream end of drum 52, so that spray pipe 64 may discharge liquid into the section of the drum aligned with downstream drainage pan 62. Spray pipe 64 is connected to a source 66 of a spray liquid. The outlet of downstream drainage pan 62 is connected to a waste drain, whereas the outlet of upstream drainage pan 60 is connected to detergent solution tank 38.

Figure 2:
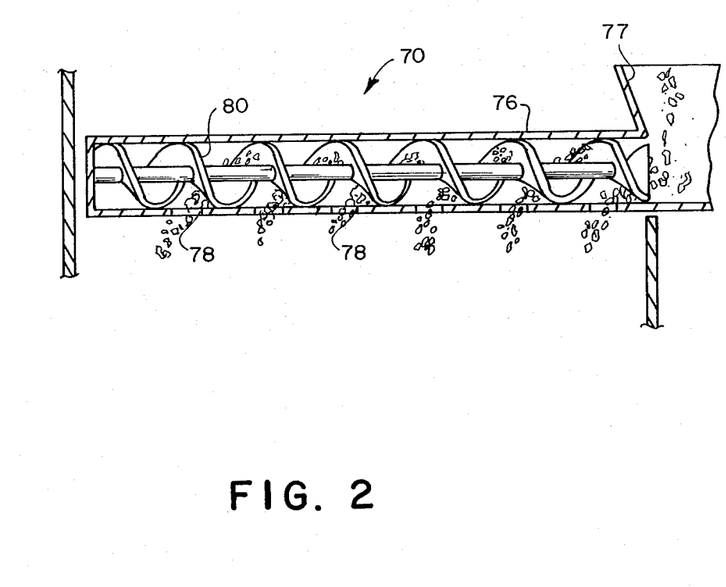
FIG. 2 is a fragmentary elevational view taken along lines 2—2 in FIG. 1.

The lower or downstream end of drum 52 has an outlet 67 connected to the inlet hopper of a flake distributing conveyor 70 incorporated in a flotation separation tank assembly 72. Although the schematic diagram of FIG. 1 illustrates a line connecting the outlet of drum 52 to conveyor 70, the outlet of the drum typically feeds directly into hopper 77. Flotation separation unit 72 includes a flotation tank 74 having an upstream end disposed beneath conveyor 70. As best seen in FIG. 2, conveyor 70 includes an elongated tubular pipe 76 with a plurality of discharge openings 78 disposed along the length of pipe 76 above tank 74. A helical auger 80 is disposed within pipe 76 and driven by an auger-drive motor (not shown) so that the auger will advance flakes deposited in hopper 77 to outlets 78. Pipe 76, and hence distributing conveyor 70, extends across the width of tank 74, i.e., in the direction facing out of the drawing sheet as seen in FIG. 1.

A paddle wheel 82 having vanes 84 is mounted adjacent the upstream end of tank 74 in proximity to distributing conveyor 70. The axis of paddle wheel 82 extends generally widthwise across tank 74 and each of vanes 84 extends parallel to the axis, across substantially the entire width of the tank. A motor 83 is arranged to drive paddle wheel 82 slowly in counterclockwise rotation as seen in FIG. 1. A source 86 of make-up liquid is connected to tank 74 and provided with a control valve 88 to control the rate of addition of the make-up liquid. Tank 74 is also provided with an overflow outlet 89 for draining off excess liquid The bottom wall 90 of tank 74 slopes upwardly from the upstream end of the tank towards the downstream end, and hence provides an inclined lower beaching plate at the bottom of tank 74. A lower drag chain 92 having a plurality of spaced bars 94 is entrained over a pair of sprockets 96 and 98 so that the lower run of chain 92 extends in proximity to lower tank wall or beaching plate 90 and the spaced bars 94 of the lower run rest upon the beaching plate. A motor 100 is linked to sprocket 96 and arranged to drive the sprocket and hence chain 92 so that the lower run of chain 92 moves upwardly along inclined beaching plate 90. A heavy fraction discharge trough 102 is arranged along the downstream edge of beaching plate 90, the trough 102 having a bottom wall sloping downwardly in the widthwise direction of tank 74, i.e., in the direction into the drawing sheet as seen in FIG. 1. The downstream edge of lower beaching plate 90 defines a substantially horizontal lip 104 extending along trough 102.

An upper, sloped beaching plate 106 is disposed above beaching plate 90 and conveyor 92. Upper beaching plate 106 extends across substantially the full width of tank 74. The upstream or lowermost end 108 of upper beaching plate 106 is disposed at a level lower than the level of lip 104 on the lower beaching plate 90. Upstream end 108 of beaching plate 106 is just slightly downstream from paddle wheel 82. An upper drag conveyor chain 110 is entrained around sprockets 112 and 114, so that the lower run of chain 110 extends in close proximity to the top surface of upper beaching plate 106. Conveyor chain 110 is equipped with drag bars 116 which rest upon the top surface of upper beaching plate 106. A drive motor 118 is provided for moving chain 110 so that the lower run of the chain moves upwardly and to the right as shown in FIG. 1. The downstream end of plate 106 defines a substantially horizontal lip 120, and a light fraction discharge trough 122 is arranged beneath this lip. Trough 122 is provided with a lowermost wall sloping downwardly in the widthwise direction of the tank, i.e., into the drawing sheet as seen in FIG. 1.

The lowermost or outlet end of light fraction discharge trough 122 is connected to the inlet of a centrifugal or spin dryer 126. Dryer 126 is a conventional basket-type spin dryer having a perforated basket 128 and devices (not shown) for spinning the basket at a high rate of speed so as to force water through the perforations and to the liquid discharge outlet 130 of the separator. The solids outlet of the separator 126 is connected to a forced air drying unit 132, and the solids outlet 134 of the forced air drying unit constitutes the final light fraction product outlet of the system.

The water outlet 130 of separator 126 is connected to a recycle water tank 131. Recycle water tank 131 is connected via appropriate pumps and lines (not shown) to troughs 102 and 122 so that recycled water can be applied to the troughs to aid in material flow along the troughs. Appropriate pipes (not shown) are also provided for directing any excess or overflow water from the overflow outlet 89 of tank 74 into recycle tank 131.

The outlet of heavy fraction discharge trough 102 is connected to the inlet of a further spin or centrifugal-type mechanical separator 138. The solids outlet of separator 138 is connected to the inlet of a further forced warm air dryer 140, whereas the liquid outlet 142 of separator 138 is connected to the waste or sewage discharge from the process. The solids outlet of dryer 140 is connected to an electrostatic separator 143. Electrostatic separator 143 is a conventional unit arranged to deposit incoming solids on a rotating drum and apply an electrostatic charge to the particles on the drum. In this arrangement, electrically insulating particles such as plastics tend to cling to the drum whereas electrically conductive materials such as metals tend to fall from the drum. The fraction which falls from the drum is directed to a conductive materials outlet 144, whereas the fraction which tends to cling to the drum is directed to a non-conductive materials outlet 146. Preferably separator 143 includes a plurality of stages in series. Outlets 144 and 146 constitute product outlets for the process. The vessels and other equipment mentioned above are provided with appropriate heaters, instrumentation, make-up fluid lines, emergency drain lines and the like (not shown), and appropriate temporary recycle pipes and valves are connected in the system for maintaining circulation through the various components during process interruptions and the like. This is particularly important in the case of pipelines intended to carry liquid slurries including the plastic flakes as, for example, the pipeline connecting variable speed pump 48 with fluid separator 50. Flakes of the type derived from plastic beverage bottles tended to segregate undesirably and to create "bridging" and hence plugging in pipes, valves and the like. Therefore, all of the components intended to carry slurries of these flakes should be free of sudden turns, flow restrictions and the like. In particular, control or throttling valves tend to create severe plugging and should not be used in handling these materials. Valves employed in the pipelines should be ball-type, quick-opening and quick-closing valves providing full pipe diameter passageways when open. The pumps employed for handling flakes should be a so called trash pump, or centrifugal pumps having vaneless or recessed impellers. Diaphragm pumps should be avoided, inasmuch as the sharp edges on the plastic flakes tend to cut common elastomeric diaphragm materials.

In a process according to one embodiment of the invention, an incoming stream of conventional beverage bottles is delivered to shredder 10 and cut into strips which are then passed through granulator 14. The incoming bottles include conventional carbonated beverage bottles with PET walls, high density polyethylene ("HDPE") base reinforcement cups and aluminum caps. Some of the bottles have polypropylene labels, whereas others have paper labels held on the PET walls by polyvinyl acetate-based adhesives. The incoming bottles are dirty, and include residual beverages consisting predominantly of sugar and water. The incoming bottles also include some low density polyethylene ("LDPE") milk containers and the like.

The raw material stream leaving granulator 14 consists predominantly of thin, plate-like flakes of PET and HDPE, together with some LDPE flakes, polypropylene and paper label fragments, and aluminum fragments. Also, some larger PET chunks are present. These larger chunks arise principally from the PET bottle necks. Many of the PET flakes have clinging label fragments and/or PVA adhesive, and all components of the material stream bear contaminating beverage residues and other dirt. The material stream also includes appreciable quantities of fine dust particles carried in with the incoming bottle stream and/or created in granulator 14.

Classifier 16 substantially removes these fine dust particles along with the major portion of the paper label fragments, and discharges these components into cyclone separator 22, where the same are trapped for later disposal. Thus, the product stream issuing from the coarse outlet of classifier 16 consists essentially of PET, HDPE and LDPE flakes, together with larger PET chunks, aluminum fragments, polypropylene label fragments and contaminants.

This unwashed or raw flake material is accumulated to form a batch of suitable size, and the batch is charged into first stage wash tank 24 along with a charge of hot detergent solution to form a washing slurry. The detergent solution may consist essentially of water and a common low foam industrial detergent. One suitable detergent is sold under the trademark OAKITE No. 161 by the Oakite Corporation of Berkeley Heights, N.J., USA. A concentration of about 3% detergent by weight may be employed. The proportion of raw flakes to detergent solution is selected to provide about 0.5 pounds raw material per gallon of detergent solution. The detergent solution is maintained at an elevated temperature, typically about 80° C. Temperatures below about 80° C. tend to decrease the efficacy of the detergent. The slurry of raw flakes and detergent solution is agitated for about 6-9 minutes. The power applied in agitation may be on the order of 0.02-0.03 hp/gallon based upon the volume of the slurry. During this washing cycle, valve 36 is closed and valve 34 is open, so that some of the slurry is continually recycled through pump 28 and line 30.

After the appropriate agitation time, valve 34 is closed, whereas valve 36 is opened so that the slurry from tank 24 is discharged into surge tank 42, where it blends with residual slurry from prior batches. Slurry is continuously withdrawn from surge tank 42 and continuously passed to the inlet of separator 50 by pump 48 at a controlled, pre-selected rate consistent with the capacity of the separation unit 50 and flotation separator 72. The slurry passes into the upstream end of drum 52. As the drum rotates about its axis, the slurry is continually tumbled and the solid particles larger than the screen opens in the slurry passes downstream along the wall of the drum. The detergent solution substantially drains from the flakes into upstream drainage pan 60, and from that drainage pan back into detergent solution reservoir 38. The detergent solution passing back into the reservoir bears the bulk of the contaminants. Thus, appropriate means (not shown) are provided for filtering particulate contaminants such as paper, fibers, insoluble dirt and the like from the drained detergent solution, and for replacing the detergent solution as needed to keep the concentration of soluble contaminants such as beverage sugars and the like, plus insoluble paper pulp and adhesive in the solution within appropriate limits.

The detergent solution does not drain completely from the flakes in the upstream section of drum 52. Thus, the flakes passing downstream of pan 60 section, towards rinsing pipe 64 typically include about 10-12% detergent solution by weight. As the flakes pass downstream to the rinsing section of drum 52, they are exposed to a spray of rinsing liquid from source 66 through spray pipe 64. Typically, the rinsing liquid may be incoming, substantially pure tap water. This rinsing liquid serves to displace the major portion of the remaining wash solution, and hence the major portion of the remaining dirt and contaminants, from the flakes as the flakes pass downstream towards the outlet 67 of drum 52. However, a minor fraction of the original wash liquid remains on the flakes discharged from the drum. As described below the rinsing liquid supply rate is regulated to control the amount of residual surfactant on the discharged flakes so as to maintain a desired surface tension and surfactant concentration within flotation tank 74. Ordinarily the mass flow rate of the rinsing liquid is about 5 to about 8 times the mass flow rate of flakes through drum 52. Higher mass flow rates tend to provide even more complete removal of contaminants from the flakes, but at the expense of greater water consumption and sewerage discharge. The rinsing liquid and contaminants drained through openings 54 in the downstream section of drum 52 are discharged through downstream collection pan 62 and then discharged, after pH correction into the waste water or sewage outlet of the process.

A continuous stream of mixed PET and polyolefin flakes thus passes from the outlet 67 of drum 52 into the inlet hopper 77 of flake distribution conveyor 70. The continuous stream of flakes entering hopper 77 is advanced by auger 80 and portions of this stream are discharged through each of openings 78 in inlet tube 76. Thus, the continuous stream of flakes is subdivided into smaller streams issuing from each opening 78, and the flakes in each smaller stream are introduced into tank 74 at a separate location along the width of the tank.

Tank 74 contains a flotation liquid consisting essentially of water and surfactants derived from the residual surfactant on the incoming flakes. This liquid is maintained at a level sufficient to immerse the lower or upstream end 108 of upper beaching plate 106 but not so high as to entirely immerse bars 116 of chain 110. As the flakes drop from distribution conveyor 70 into the liquid in tank 74, the impact of the falling flakes on the top surface of the liquid tends to break up clumps or agglomerations of flakes. Paddle wheel 82 is rotated slowly, typically at about one-half rpm so that the vanes 84 of the paddle wheel pass downwardly through the top surface of the liquid without creating substantial turbulence, foaming or air entrainment. The vanes passing downwardly into the liquid engage the flakes as the flakes enter the liquid. As the flakes are engaged by the moving vanes 84, the flakes are forced downwardly into the flotation liquid.

As the mixed flakes pass downwardly into the flotation liquid, they pass out from under paddle wheel 82. As polyolefins such as HDPE, LDPE and polypropylene are all less dense than water, and typically have densities in the range of about 0.85 to 0.95, flakes and other particles consisting of these materials will tend to float. Conversely, PET has a density of about 1.4 and aluminum has a density of about 2.5. Therefore, flakes and other particles consisting of these materials will tend to sink. The flakes as initially introduced into the flotation liquid ordinarily are in intimate contact with one another. To achieve separation of the different materials in the mixed flake stream according to their densities, the flakes must be detached from one another so that each flake may sink or float depending on its own density. The forces tending to separate the flakes from one another are relatively small, inasmuch as these forces are created only by the buoyancy or sinking tendency of the individual flakes. Thus, the maximum force available to pull a HDPE flake away from a PET flake would be equal to the buoyancy of the polyethylene flake. This force may be on the order of a few milligrams. Although the present invention is not limited by any theory of operation, it is believed that the enhanced separation of high and low specific gravity flakes according to the present invention results at least in part from the action of the surfactant in the flotation liquid in facilitating this detachment of flakes from one another. Separation of the incoming mixed flake stream into smaller streams by conveyor 70 and introduction of these streams into tank 74 at different locations and the impact of the falling flakes on the flotation liquid also facilitate detachment of the individual flakes from one another.

The polyolefin flakes which float in the flotation liquid pass downstream and onto upper beaching plate 106. This relatively light fraction, consisting essentially of HDPE with minor amounts of LDPE and polypropylene is withdrawn from the flotation liquid by conveyor 110. Thus, the bars 116 of the conveyor push the light fraction up beaching plate 106 and over lip 120 into trough 122. The heavy fraction, consisting essentially of PET flakes, larger PET chunks and aluminum fragments sinks downwardly onto lower beaching plate 90 and is withdrawn from the flotation liquid into trough 102 by the action of conveyor chain 92. Each fraction withdrawn from the flotation liquid carries a minor residue of the flotation liquid with it. Depending upon the particular design and speed of operation of the conveyors, the amount of flotation liquid so withdrawn may equal or exceed the amount of liquid entering tank 74 with the incoming mixed flakes from unit 50. If the amount of flotation liquid removed is less than the incidental additions, there will be some overflow from the flotation tank via outlet 89 into recycle water tank 131. Otherwise, some make-up water may be added from source 86.

It is important to maintain an effective level of surfactant in the flotation liquid within tank 74. Pure water typically has a surface tension between about 70 and 79 dynes/cm. The concentration of surfactant in the flotation liquid should be high enough to reduce the surface tension of the flotation liquid to no more than about 45 dynes/cm and preferably no more than about 40 dynes/cm. Most preferably, the surface tension of the flotation liquid is between about 30 and about 40 dynes/cm. These values of surface tension typically are attained with surfactant concentrations in the flotation liquid of below about 250 ppm and preferably below about 200 ppm. Reducing the surface tension below about 30 dynes/cm usually does not further enhance separation of the light and heavy fractions in the flotation operation. However, such low values of surface tension typically imply surfactant concentrations in the flotation liquid above about 200-250 ppm. These high concentrations of surfactants may result in undesirably high quantities of surfactants in the final recycled products discharged from the process. Also, the tendency of the flotation liquid to foam increases with the surfactant concentration. For these reasons, the range of surface tension from about 30 to about 40 dynes/cm represents an optimum.

The surface tension of the flotation liquid preferably is monitored by conventional instruments such as a surface tension ring and balance or a capillary tube surface tensiometer. The mass flow rate of rinsing liquid from spray pipe 64 of wash liquid separation unit 50 preferably is adjusted to maintain the desired surface tension in the flotation liquid. Thus, where the surface tension reading indicates that excessive surfactant is present in the flotation liquid, an increase in the rinse liquid mass flow rate will reduce the surfactant content of the mixed flakes supplied to the flotation tank and hence will ultimately reduce the surfactant content of the flotation liquid. Conversely, reduction in the mass flow rate of the rinsing liquid will tend to increase the residual surfactant content of the mixed flakes supplied to the flotation step and hence to decrease the surface tension of the flotation liquid and increase its surfactant content. Where the wash liquid contains particularly high concentrations of contaminants, such that relatively high rinse liquid flow rates are required for acceptable contaminant removal, the amount of residual surfactant on the flakes may be insufficient to maintain the flotation liquid surface tension as desired. In this case, additional surfactant may be added directly to the flotation liquid. Such additional surfactant preferably is selected to provide a relatively low foaming tendency. Ethoxylated higher alkanes such as polyalkylene glycol ether may be employed. The surfactant available under the trademark MINIFOAM from Union Carbide Corporation of Danbury, Connecticut may be used for this purpose.

The light flake fraction discharged into trough 122 is swept from the trough preferably by mechanical action of an auger (not shown) and/or a stream of recycled flotation liquid from tank 131. This light fraction as discharged from the trough includes some residual flotation liquid from tank 74. The light fraction is conveyed to mechanical separator 126, where the major portion of the flotation liquid and fresh water from source 86, if necessary, are removed by centrifugation. The major portion of surfactants and any contaminants present in the flotation liquid are also removed in this mechanical separation step. In effect, the flotation step in conjunction with the mechanical separation step acts as a final rinsing operation. The light fraction, after this mechanical separation step, passes to forced warm air dryer 132. The stream of warm, dry air in this unit strips off the remaining free water and also removes some of the very thin polypropylene portions derived from bottle labels. The remainder, consisting essentially of polyethylene and predominately HDPE is discharged through outlet 134 as a final product. This product is suitable for normal processing by conventional plastic molding and extrusion techniques.

The heavy fraction discharged from the flotation step via trough 102 passes through separator 138 where again, the major portion of the residual flotation liquid, and fresh water from source 86, if necessary, are stripped from the fraction. This fraction consists essentially of PET and aluminum. The heavy fraction passes through dryer 140, where it is dried to moisture content of less than about 0.5%. At this level, there is essentially no free surface water on the PET or aluminum and hence the material is well suited to processing in electrostatic separator 143. In the electrostatic separator, the electrically conductive materials, consisting essentially of aluminum are separated and discharged through outlet 144. The recovered aluminum is typically pure enough for sale as recycled aluminum. The electrically non-conductive portion of the heavy fraction, consisting essentially of PET, is discharged through outlet 146. The recovered PET is pure enough for processing by conventional methods used for PET and hence has considerable commercial value. In particular, the recovered PET has a very low content of polyolefins.

The following comparative example illustrates the benefits attainable according to preferred aspects of the present invention.

COMPARATIVE EXAMPLE

A process is conducted substantially as described but using a flotation tank without the flake distribution conveyor 70 and without paddle wheel 82. Also, the rinsing water mass flow rate is about 15 gallons per pound of flakes processed through wash liquid separation unit 50. This rinse strips substantially all of the surfactant from the washed flakes so that the flotation liquid consists essentially of pure water with a surface tension of about 70 dynes/cm. In this rudimentary process, not in accordance with the present invention, and using a flake throughput rate of about 208 pounds per hour, the resulting pet product contains about 2.2 weight percent polyethylene and hence is not acceptable as commercial recycled PET.

The same process is repeated with the flake distribution conveyor and paddle wheel installed and operating, again with a flotation liquid consisting essentially of pure water and having a surface tension of about 70 dynes/cm. Again, at a flake throughput rate of 208 pounds per hour, the recovered PET has a polyethylene content of 0.32 weight percent, and still is unacceptable as commercial recycled PET for most applications.

The process is once again repeated, but with the rinsing water mass throughput rate reduced to about 1.5 gallons per pound of flakes so that the surfactant content of the flotation liquid is about 200 ppm and the surface tension is about 30 dynes/cm. At the same 208 pounds per hour flake throughput rate, the final PET product contains only about 0.04 weight percent PET and hence is commercially salable as recycled PET for most applications. Moreover, this enhanced product quality is achieved with about a 90% reduction in rinse water consumption while still maintaining acceptable levels of contaminants such as sugars, dirt and the like in the PET and polyolefin fractions discharged from the process.

In a process according to a further embodiment of the present invention, the substantially pure tap water rinse liquid utilized in the embodiment discussed above is replaced by a rinse liquid which itself incorporates a surfactant. Surfactants employed in rinse liquids are referred to herein as "rinse aids". A rise liquid incorporating a rinse aid typically is more effective than an equal quantity of plain water in displacing residual wash liquid from flakes in the rinse section of wash separation unit 50. Desirably, the surfactant incorporated in the rinse liquid is a relatively low foaming surfactant, such as the aforementioned MINIFOAM. Therefore, good removal of residual wash liquid and hence residual contaminants may be achieved at relatively low rinse liquid flows. In processes according to this embodiment, the major portion of the surfactant retained on the flakes discharged from the wash liquid separation step typically consists of the rinse liquid surfactant. In processes according to this embodiment of the invention, the surfactant concentration in the flotation liquid typically is controlled by controlling the surfactant concentration in the rinse liquid so as to control the amount of retained surfactant on the flakes furnished to the flotation step.

In a process according to a further embodiment of the invention, the flake fractions are swept along troughs 102 and 122 by a stream of fresh, substantially surfactant-free make-up water. As this fresh water contacts the light and heavy flake fractions, it dilutes any residual surfactant on the flakes. The fresh water is separated from the flakes along with residual flotation liquid in the mechanical separators 136 and 138. The separated liquid, consisting principally of fresh water, may be returned to flotation tank 74, so that excess flotation liquid is continually discharged from the tank via overflow 89. In effect, the flake fractions withdrawn from the flotation tank are given a final rinse with the fresh make-up water before that fresh water is added to the flotation liquid.

As will be appreciated, numerous variations and combinations of the features described above can be utilized without departing from the present invention. Thus, it is possible to free the flakes entirely of any retained surfactant in the wash liquid separation step and to add all of the surfactant separately to the flotation liquid. As will be appreciated, this arrangement is markedly less preferred inasmuch as substantial rinsing liquid flows would be required. Also, although the invention is particularly valuable in treatment of plastic flakes of the types encountered during reprocessing of recycled beverage bottles, similar benefits can be obtained in processing of plastic flakes from other sources. The benefits of the present invention are particularly pronounced with aqueous flotation liquids inasmuch as aqueous flotation liquids without surfactants tend to have relatively high surface tension. However, it should be clear from the foregoing disclosure that the invention in its broadest compass could be applied to systems utilizing liquids other than aqueous liquids. As these and other variations combinations and modifications of the features described above can be utilized without departing from the spirit of this invention, the foregoing description of the preferred embodiments should be taken in the way of illustration rather than by way of limitation of the invention as defined in the claims.

We claim:

1. A method of separating raw mixed plastic flakes of high and low densities into heavy and light fractions comprising the steps of washing said raw mixed plastic flakes in a wash liquid and substantially separating said wash liquid from the washed flakes wherein at least one of said washing or said separating of said wash liquid steps includes the use of a liquid containing a surfactant which contacts the flakes, said separation of said wash liquid being effected such that the surfactant is retained on said mixed flakes at the end of said wash liquid separating step, placing said mixed flakes having said retained surfactanat thereon into a flotation liquid having a density intermediate to said heavy and light fractions, and facilitating disengagement of said mixed flakes from one another by maintaining in said flotation liquid a concentration of a surfactant effective to substantially reduce the surface tension of the liquid, said retained surfactant constituting at least a part of said surfactant in said flotation liquid whereby the mixed flakes separate into a light fraction which floats on said flotation liquid and a heavy fraction which does not float on said flotation liquid.

2. A method as claimed in claim I further comprising the step of maintaining said flotation liquid substantially free of foam.

3. A method as claimed in claim 1 wherein said wash liquid includes a surfactant and said wash liquid separation step includes the step of retaining a minor fraction of said wash liquid on said mixed flakes so that said retained surfactant on said mixed flakes includes a portion of said surfactant initially present in said wash liquid.

4. A method as claimed in claim 1 wherein said wash liquid separation step includes the step of rinsing said wash liquid from the washed flakes with a rinsing liquid including a rinsing surfactant and retaining a fraction of said rinsing liquid on said mixed flakes so that said retained surfactant includes a portion of said rinsing liquid surfactant.

5. A method as claimed in claim 1 wherein said raw flakes include fragments of plastic containers.

6. A method as claimed in claim 5 further comprising the step of comminuting said containers to provide said raw flakes.

7. A method as claimed in claim 5 wherein said raw flakes include fragments of beverage bottles.

8. A method as claimed in claim 7 wherein said raw flakes include fragments of beverage bottles having polyethylene terepthalate portions and polyolefin portions, whereby said mixed flakes will include polyethylene terepthalate flakes and polyolefin flakes, said heavy fraction includes said polyethylene terepthalate flakes and said light fraction includes said polyolefin flakes, and wherein said flotation liquid is an aqueous liquid.

9. A method as claimed in claim 1 wherein said flakes have a mean aspect ratio of at least about 10.

10. A method as claimed in claim 9 wherein said flotation liquid is an aqueous flotation liquid.

11. A method as claimed in claim 10 wherein said low density flakes have a specific gravity of less than about 1.0 and more than about 0.85.

12. A method as claimed in claim 11 wherein said low density flakes consist essentially of one of more polyolefins.

13. A method as claimed in claim 12 wherein said high density flakes consist essentially of polyethylene terepthalate.

14. A method as claimed in claim 10 wherein said aqueous flotation liquid consists essentially of said surfactant and water.

15. A method as claimed in claim 10 wherein said step of maintaining said concentration of said surfactant includes the step of maintaining the surface tension of said flotation liquid at below about 45 dynes/cm.

16. A method as claimed in claim 15 wherein said surface tension of said flotation liquid is maintained at between about 30 and about 40 dynes/cm.

17. A method as claimed in claim 15 wherein the concentration of said surfactant in said flotation liquid is maintained at less than about 250 ppm.

18. A method as claimed in claim 1 wherein said step of recovering said fractions includes the steps of separately withdrawing each of said fractions from said flotation liquid together with a residue of said flotation liquid and removing said residues from said fractions.

19. A method as claimed in claim 18 wherein said step of removing said residues from said fractions includes the step of removing at least the major portion of each said residue from the associated fraction by mechanical separation, whereby at least the major portion of any surfactant in each said residue is removed from the associated fraction.

20. A method as claimed in claim 19 wherein said step of removing said residues includes the step of contacting at least one of said fractions with a fresh, substantially surfactant-free liquid before said mechanical separation, so that said fresh liquid blends with said flotation liquid residue on such fraction and said fresh liquid is removed from such fraction in said mechanical separation.

21. A method as claimed in claim 20 further comprising the steps of recovering liquid separated from said at least one fraction in said mechanical separation and adding said recovered liquid to said flotation liquid.

22. A method as claimed in claim 1 wherein said step of placing said flakes into said flotation liquid includes the step of forcibly submerging said mixed flakes in said flotation liquid.

23. A method as claimed in claim, 22 wherein said mixed flakes are supplied as a substantially continuous stream to said placing step, and said placing step includes the step of subdividing said substantially continuous stream into smaller streams and introducing each of said smaller streams at a different location within said flotation liquid.

* * * * *